July 26, 1966  C. E. KAEMPEN  3,262,654

SPACE RENDEZVOUS APPARATUS AND METHOD

Filed Aug. 30, 1963  13 Sheets-Sheet 1

INVENTOR.
CHARLES E. KAEMPEN
BY
Fryer & Tjensvold
ATTORNEYS

July 26, 1966  C. E. KAEMPEN  3,262,654
SPACE RENDEZVOUS APPARATUS AND METHOD
Filed Aug. 30, 1963  13 Sheets-Sheet 2
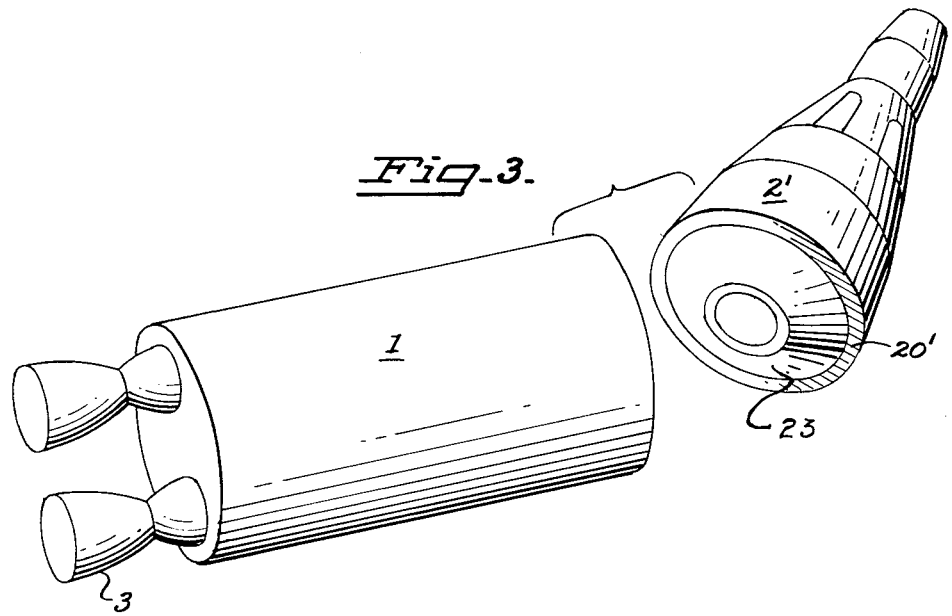
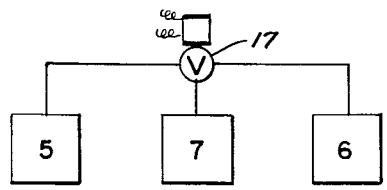
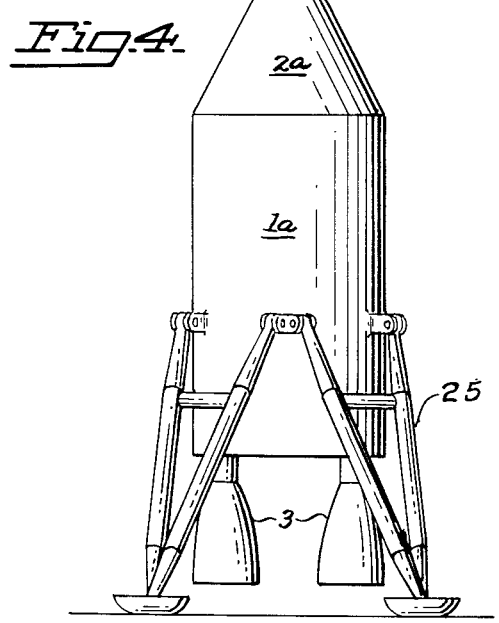
INVENTOR.
CHARLES E. KAEMPEN
BY
ATTORNEYS July 26, 1966   C. E. KAEMPEN   3,262,654
SPACE RENDEZVOUS APPARATUS AND METHOD
Filed Aug. 30, 1963   13 Sheets-Sheet 3
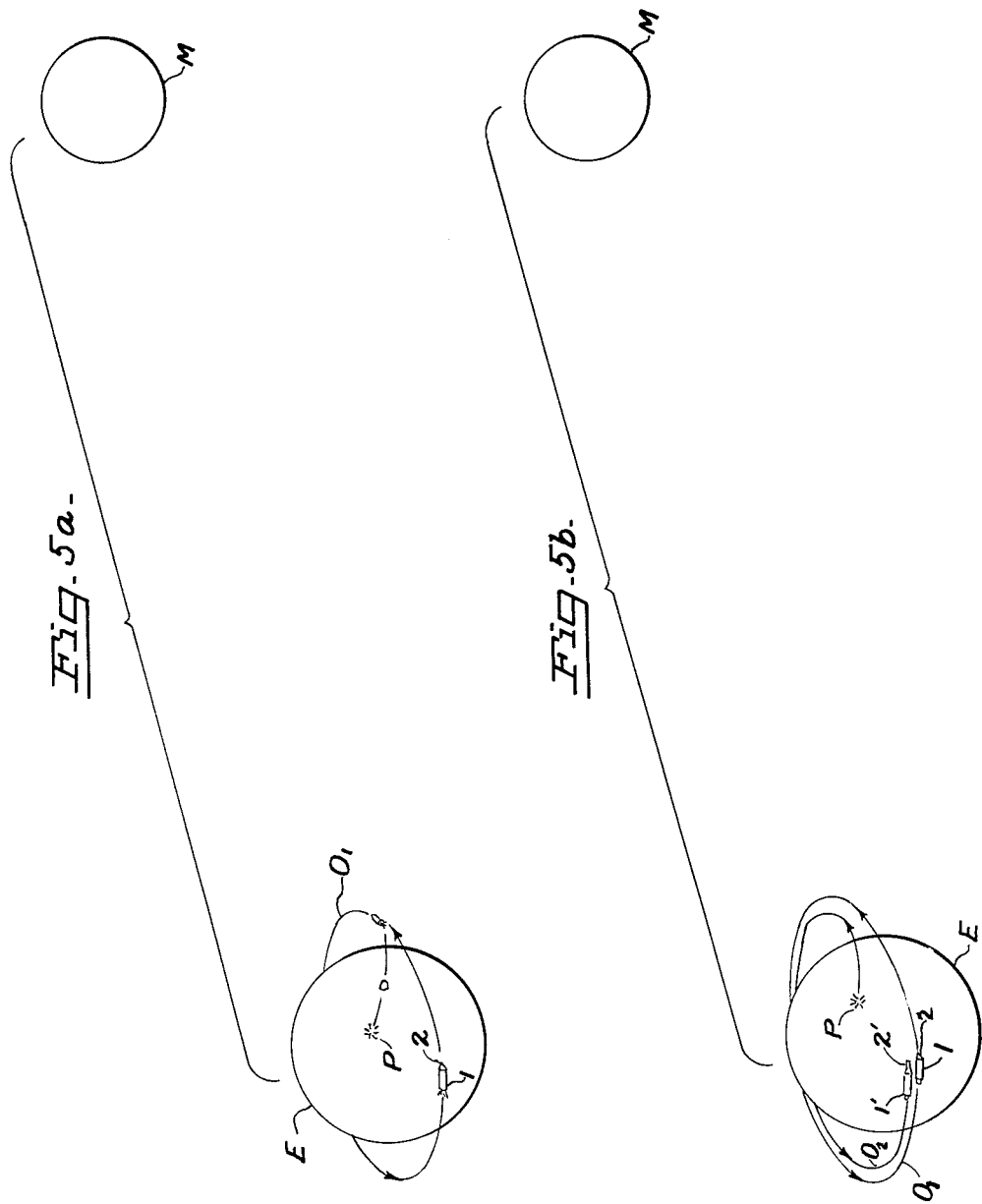
INVENTOR.
CHARLES E. KAEMPEN
BY
*Fryer + Tjensvold*
ATTORNEYS

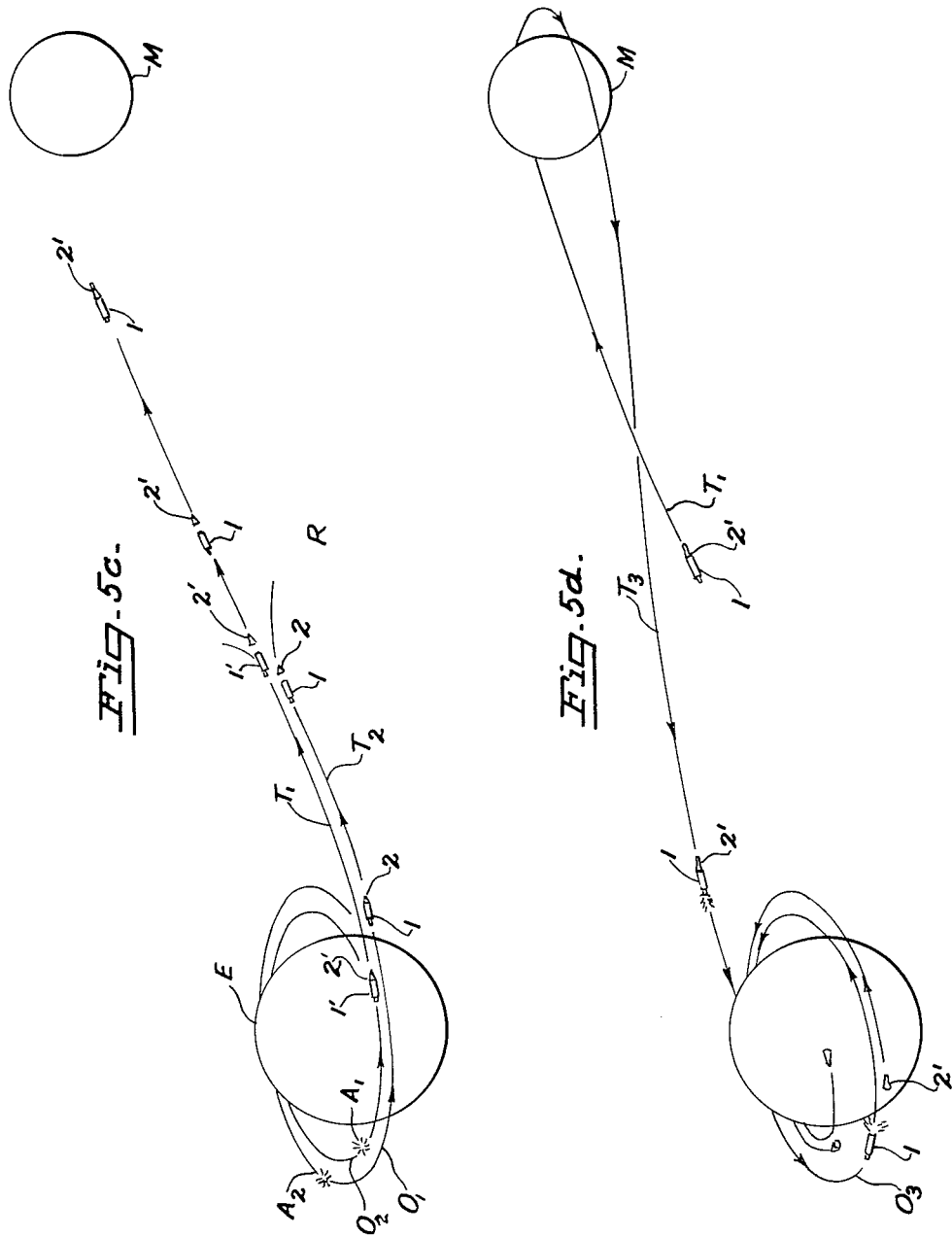

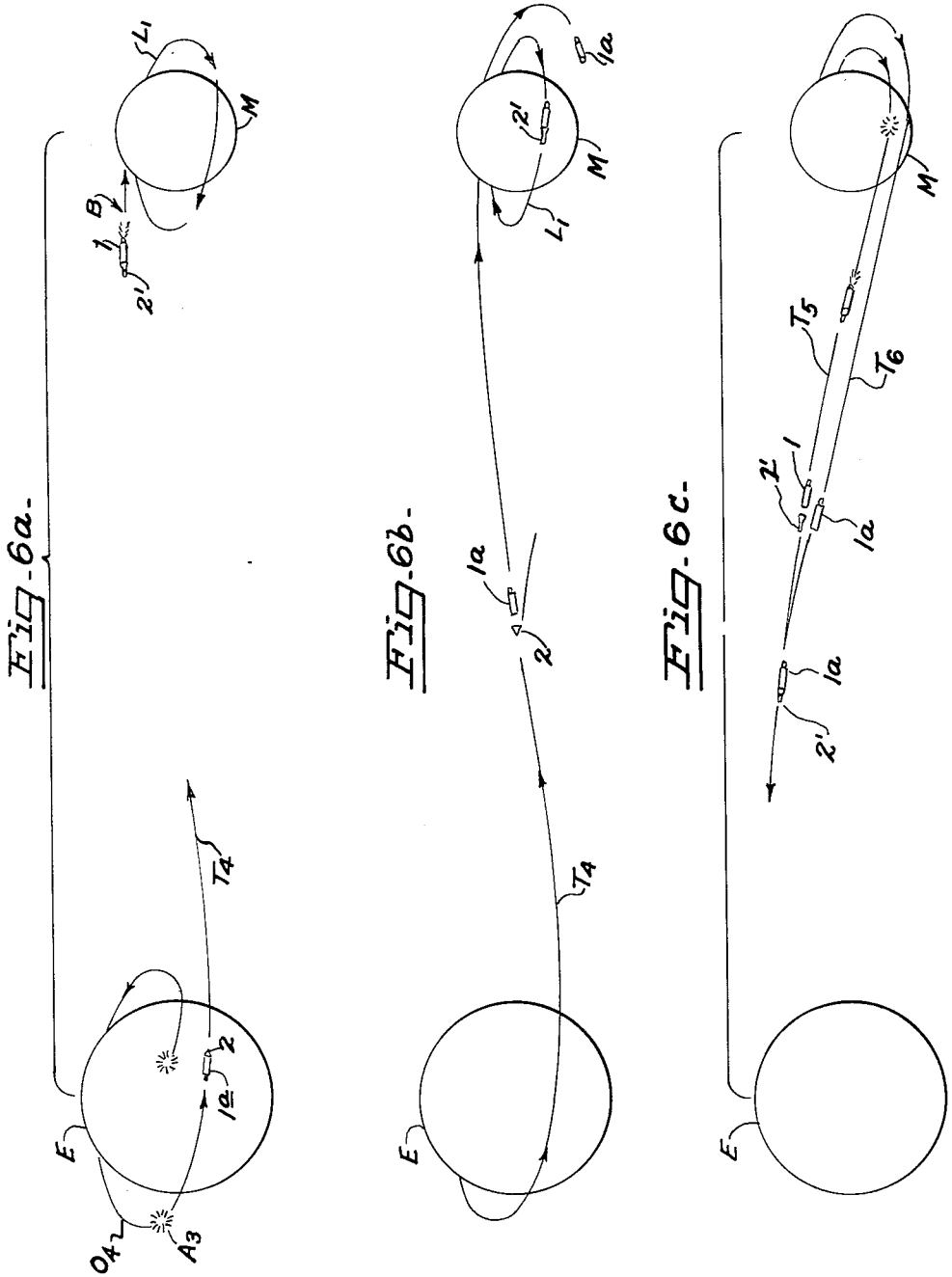

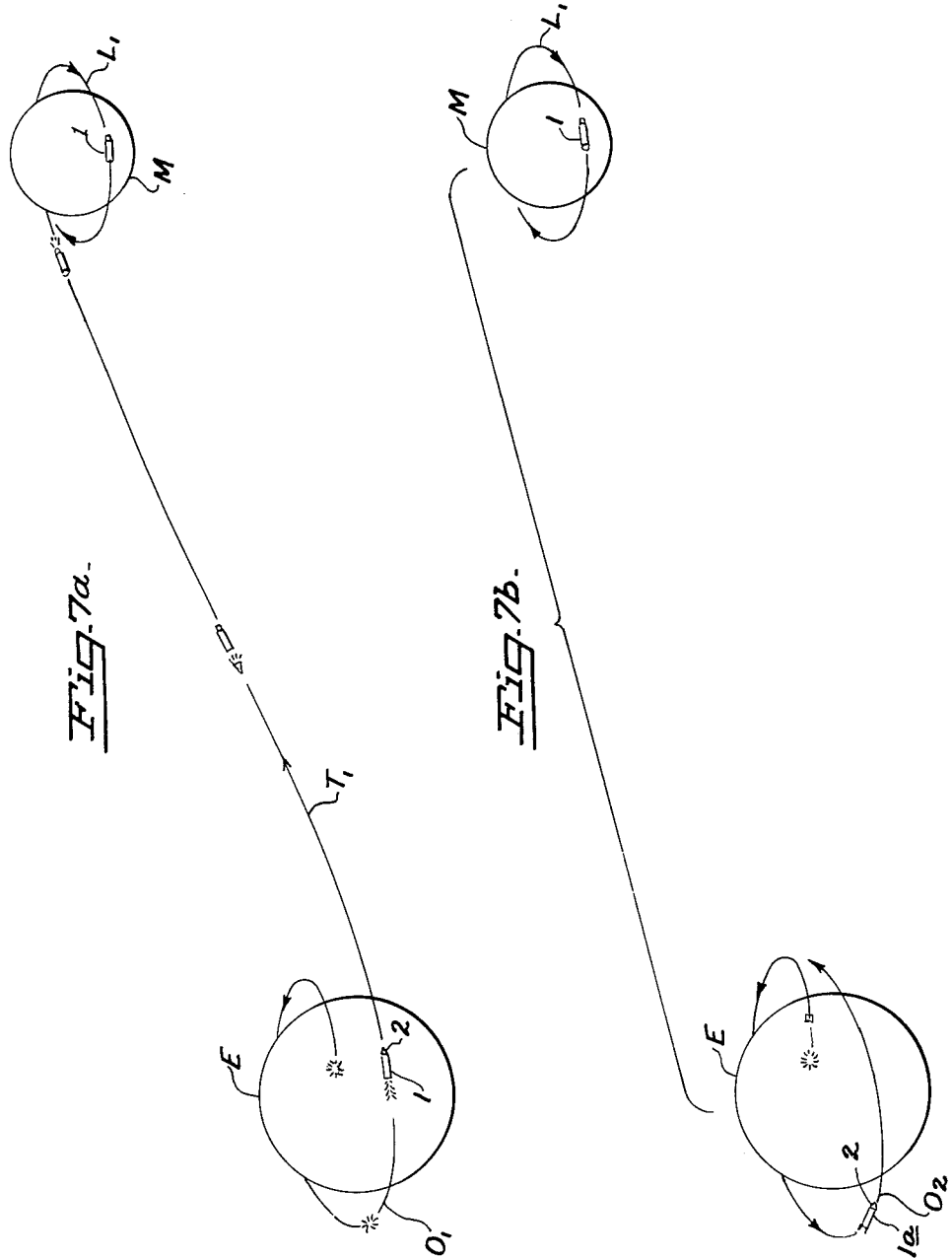

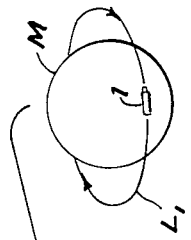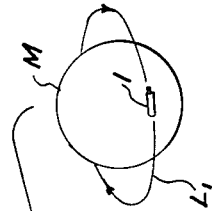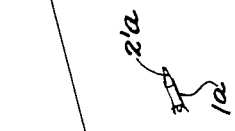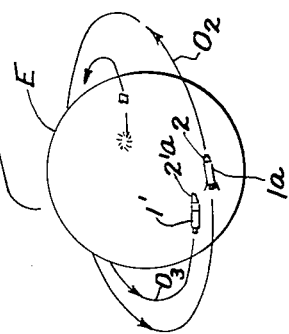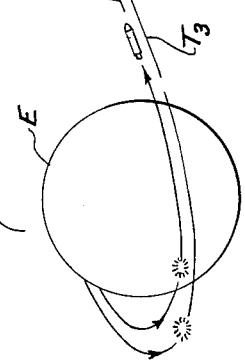
Fig. 7c.
Fig. 7d.

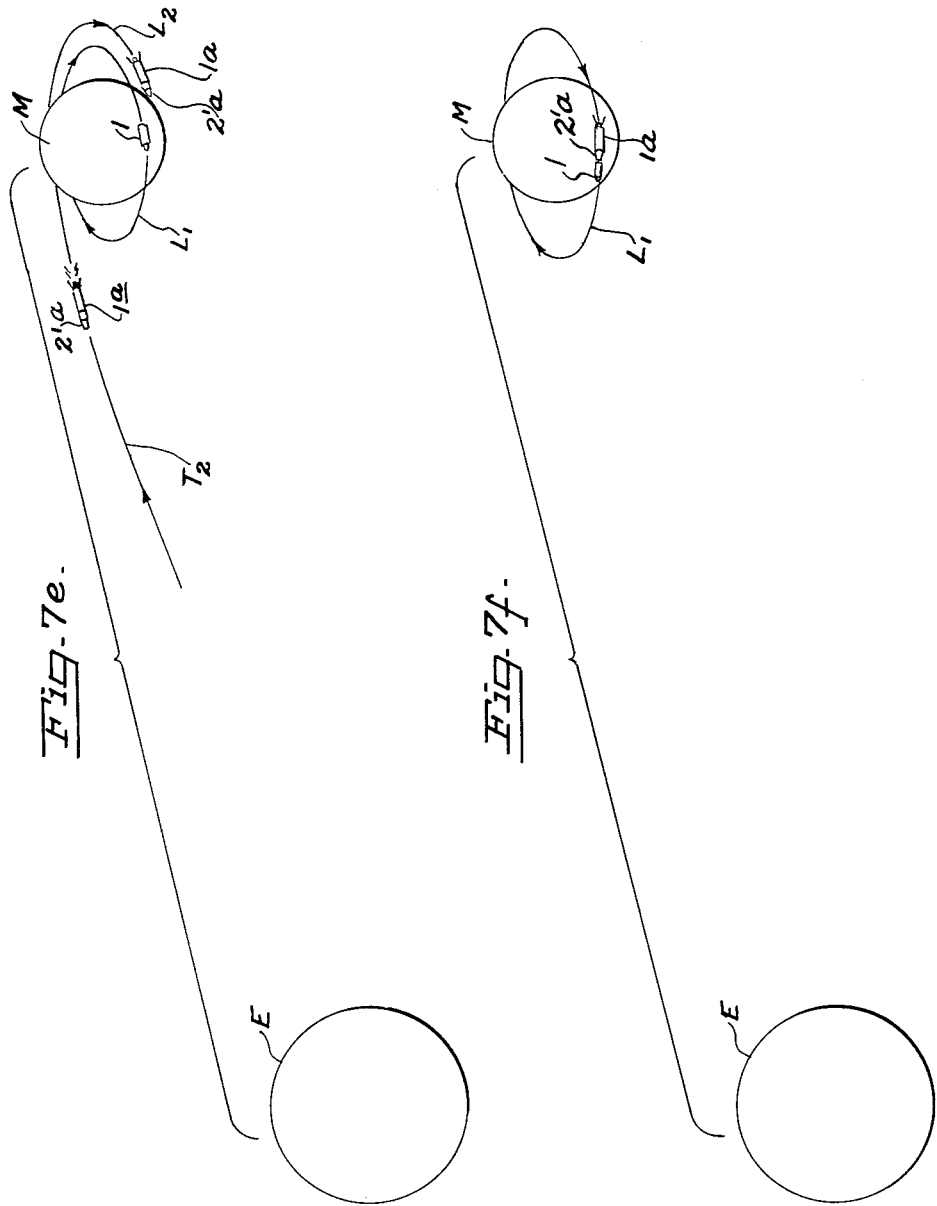

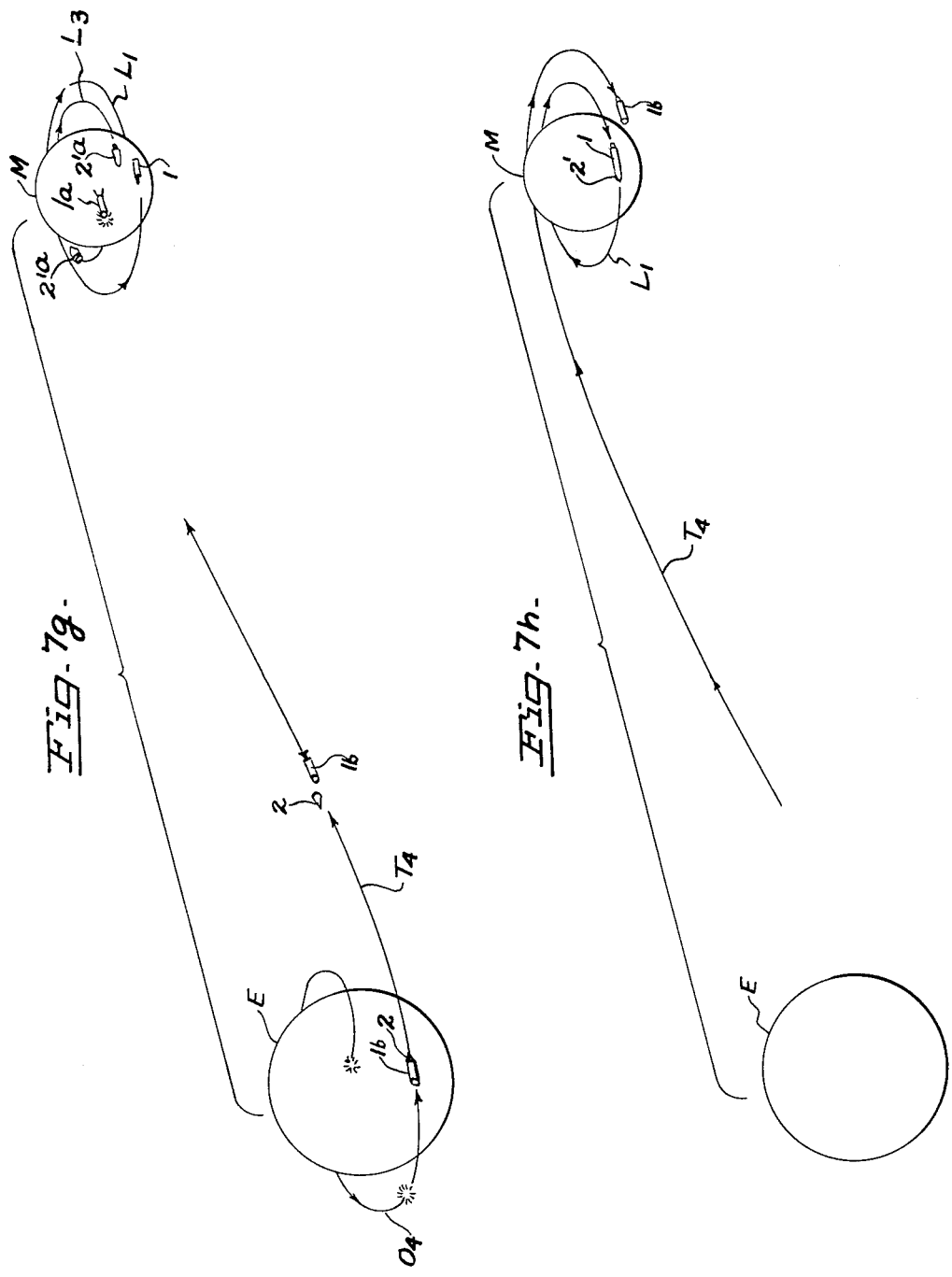

July 26, 1966  C. E. KAEMPEN  3,262,654
SPACE RENDEZVOUS APPARATUS AND METHOD
Filed Aug. 30, 1963  13 Sheets-Sheet 10
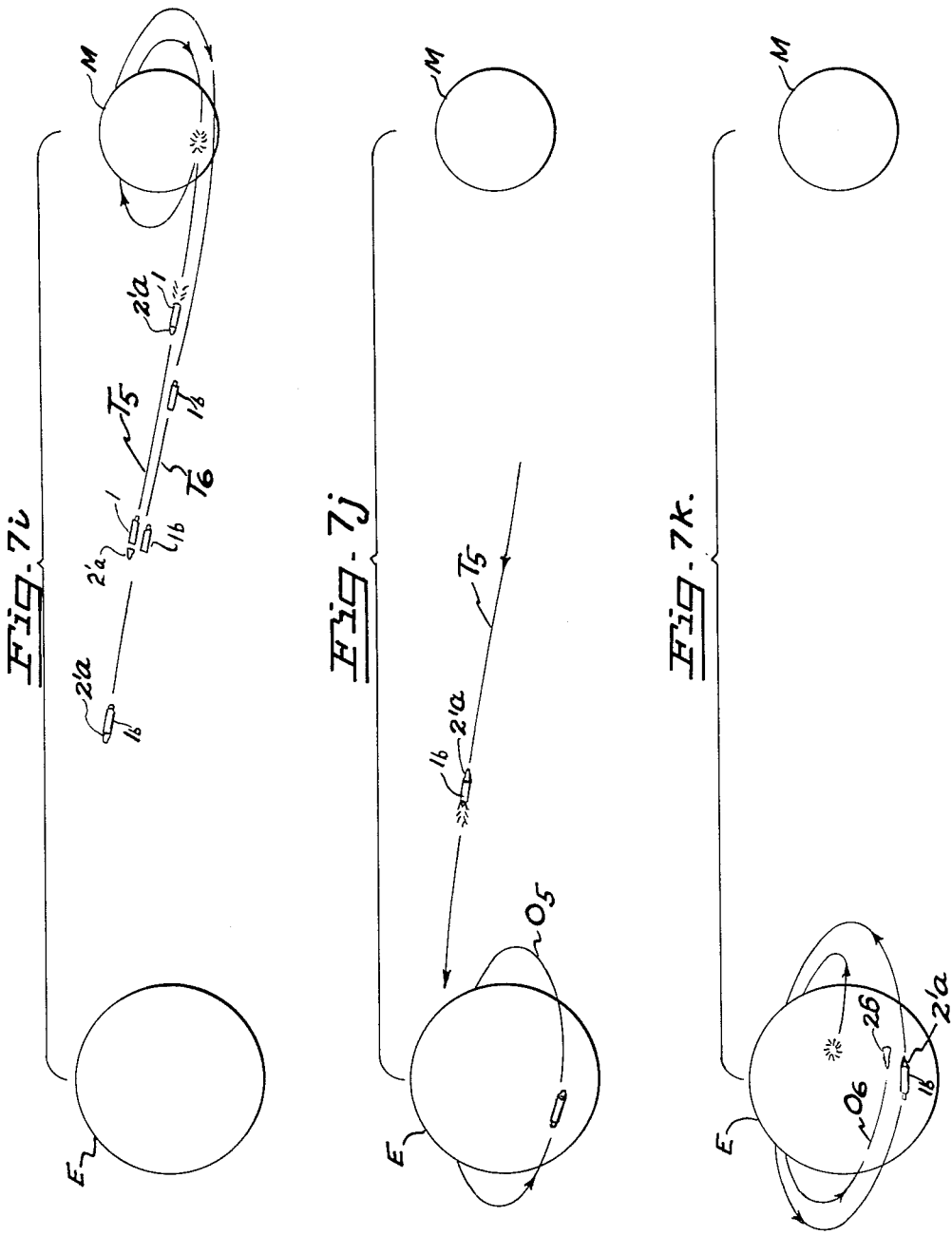
INVENTOR.
CHARLES E. KAEMPEN
BY
Fryer & Tjensvold
ATTORNEYS July 26, 1966   C. E. KAEMPEN   3,262,654
SPACE RENDEZVOUS APPARATUS AND METHOD
Filed Aug. 30, 1963   13 Sheets-Sheet 11
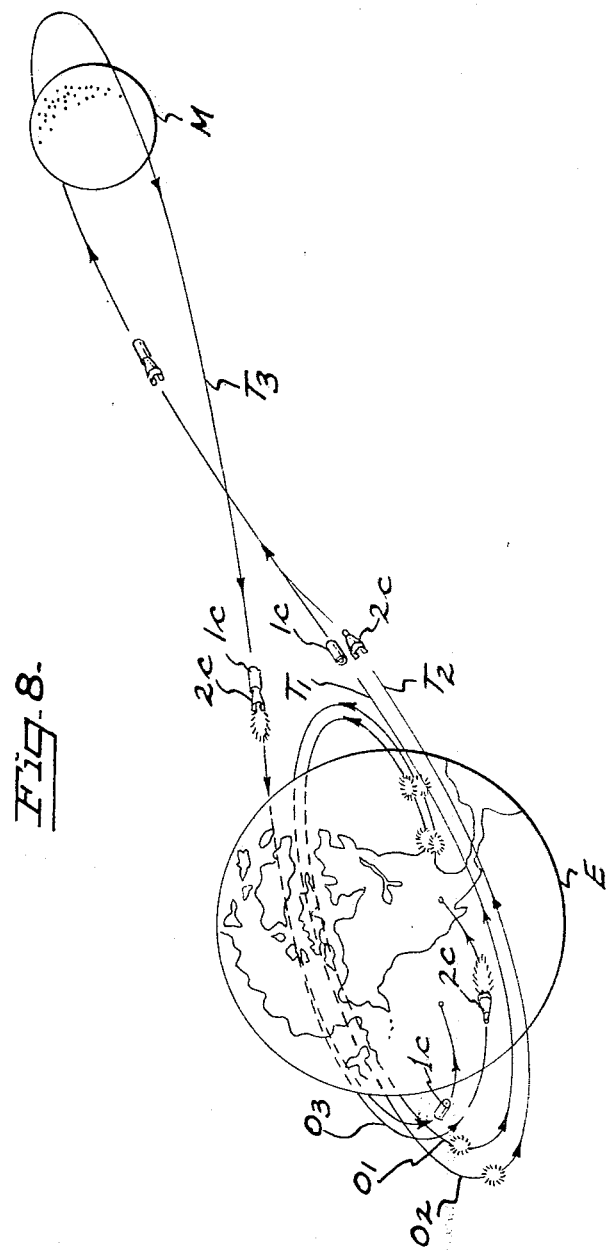
INVENTOR.
CHARLES E. KAEMPEN
BY
*Fryer & Tjensvold*
ATTORNEYS July 26, 1966  C. E. KAEMPEN  3,262,654
SPACE RENDEZVOUS APPARATUS AND METHOD
Filed Aug. 30, 1963  13 Sheets-Sheet 12
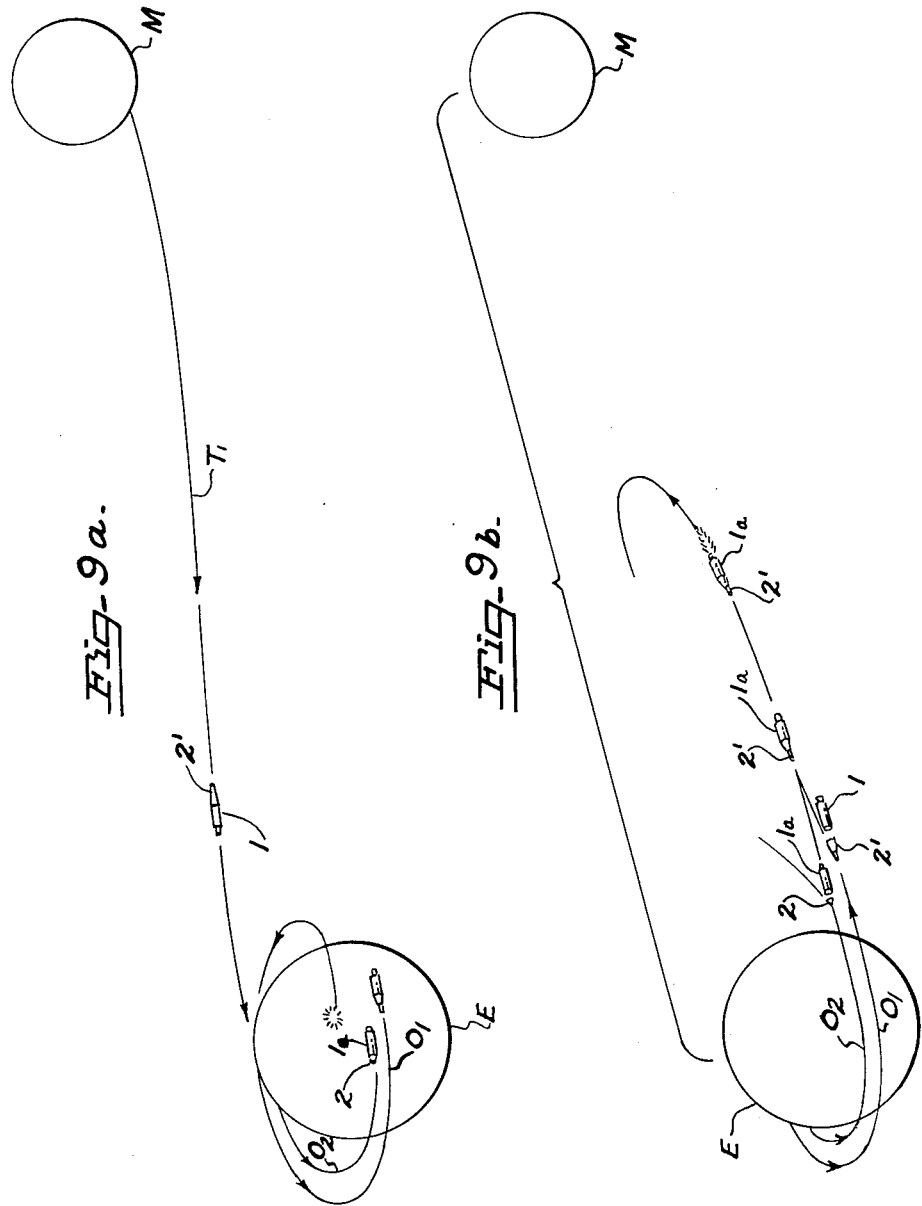
INVENTOR.
CHARLES E. KAEMPEN
BY
*Fryer & Tjensvold*
ATTORNEYS

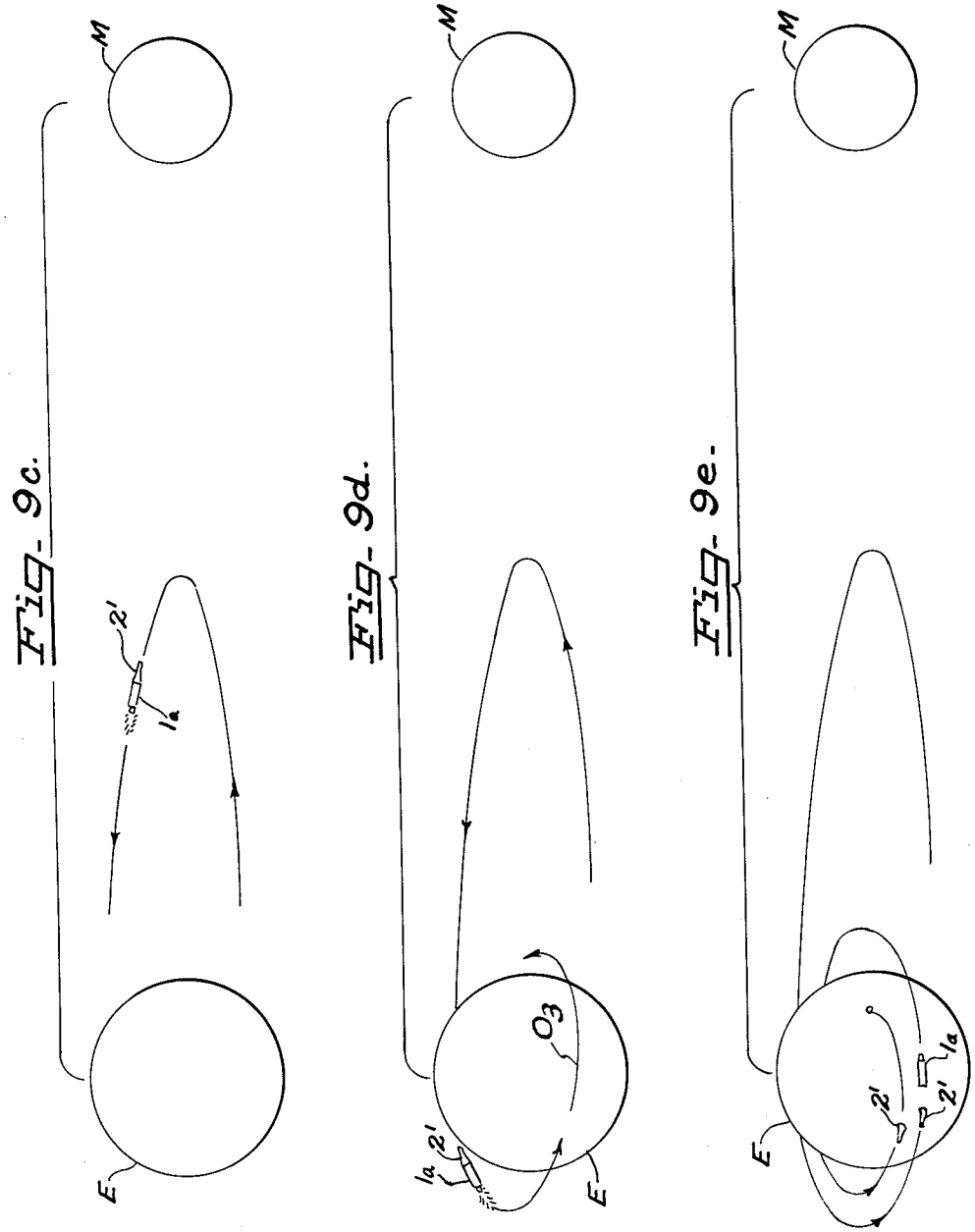

United States Patent Office 3,262,654
Patented July 26, 1966

3,262,654
SPACE RENDEZVOUS APPARATUS AND METHOD
Charles E. Kaempen, 3202 Larkstone Drive,
Orange, Calif.
Filed Aug. 30, 1963, Ser. No. 305,630
11 Claims. (Cl. 244—1)

This invention relates to an apparatus and method for effecting a space rendezvous and more particularly relates to an in-transit or linear rendezvous mode of space transport employing trajectory operations conducted by two or more individually launched space units adapted to rendezvous in-transit for asembly into a single spacecraft.

Present day apparatuses and methods for effecting a space rendezvous have been planned for operations which occur in low energy, multiple-pass, short period and low apogee altitude orbits of a central body and in the regime of circular or elliptical velocity, also termed "satellite velocity." The herein termed "orbital rendezvous" technique contemplates combining together two or more vehicles in order to carry out a particular space operation, such as those presented in connection with the well known Gemini and Apollo programs.

Wherever a rocket booster has been involved in connection with such an operation, the booster has been designed to effect a docking in rendezvous with a payload before the rocket began its planned, out-of-orbit flight. The limitations inherent in designing an apparatus for use in connection with "orbital rendezvous" operations severely restrict features of reliability, safety, vulnerability, availability and versatility, which factors are of paramount concern to the efficient achievement of any particular space mission.

The above, briefly described method of "orbital rendezvous" comprises the meeting together in space of two or more objects so that either or both objects possess for a period of time similar orbital elements, such as orbit inclination, velocity, altitude and direction of travel. Such an "orbital rendezvous" has been limited to performance in relatively low energy or parking orbits having orbital periods measured in minutes or hours and characterized by satellites that repeatedly pass over continental regions from which the are originated. The final steps in such an "orbital rendezvous" method consists of a docking and attachment operation completed in the near-earth satellite regions. The final assembly then continues to orbit as a single object in a low (at or below synchronous orbit altitudes) earth orbit at "satellite velocity."

This invention provides an apparatus and method whereby space rendezvous and docking no longer need be restricted to satellite orbits, but may now be performed at any altitude and in parabolic or hyperbolic orbits wherein the rendezvousing objects proceed at or near local escape velocity. Local escape velocity is generally considered to approximate 1.414 times the local satellite velocity.

In accordance with the novel aspects of this invention, rendezvous and docking operations can now occur after the rocket booster has initiated its thrust operation and has delivered its payload into a high energy orbit.

A "high energy orbit" is herein defined as that orbit which is other than a circular satellite or low energy orbit. Whereas the "high energy orbit" has a parabolic or hyperbolic configuration, a satellite orbit comprises a circular or elliptical configuration. The apogee altitude of a high energy orbit with rescept to the planet Earth, for example, would exceed approximately thirty earth radii (120,000 miles). A "high energy orbit" results when orbit injection velocity exceeds 1.402 times the circular velocity of a 100 mile satellite (35,846 f.p.s.).

The apparatus of this invention comprises a rocket booster having a thrust unit forming a uniquely arranged docking face on a fore-end thereof adapted to receive and be coupled to a manned or unmanned payload unit pursuant to an in-transit space rendezvous. In carrying forth the steps in one of the hereinafter more specifically described methods of operation, two such boosters may be employed with a primary booster arranged to jettison an expended fuel containing propellant unit therefrom. A secondary booster then discharges a payload unit from a fore-end thereof which unit is later coupled to the docking face of the thrust unit. Means are provided whereby the above desiderate may be efficiently achieved.

In accordace with the above discussion, an object of this invention is to provide an apparatus and method for efficiently effecting an in-transit space rendezvous.

Another object of this invention is to provide an apparatus and method whereby a rendezvous and docking operation may be effected between two objects in a "high energy orbit" in order to effectively carry forth a space operation.

Other and more specific objects of this invention will become apparent from the following description taken in connection with the accompanying drawings wherein:

FIG. 1a shows schematically the arrangement between the fuel tanks and an interconnecting valve;

FIG. 3 is a perspective view of the primary rocket booster of FIG. 1 preparing to dock with a payload following a rendezvous in space;

FIG. 4 is an elevational view disclosing a modified version of the rocket booster of FIG. 1 comprising landing gears mounted thereon;

FIGS. 5a–5d illustrate a method whereby the primary and secondary boosters of FIGS. 1–3 may be employed to perform a circumlunar mission;

FIGS. 6a–6c illustrate method steps which may be employed to supplement the method steps illustrated in FIGS. 5a–5d to perform a lunar orbit mission;

FIGS. 7a–7f illustrate a method whereby a one-way logistic mission to the surface of the Moon may be performed;

FIGS. 7g–7k illustrate further method steps which may be used in addition to the method steps illustrated in FIGS. 7a–7f to perform a round-trip, manned mission to the Moon's surface.

FIG. 8 illustrates a method which may be employed to perform a circumlunar mission by use of other types of orbital rocket boosters than those disclosed in FIGS. 1–3; and, FIGS. 9a–9e illustrate a method whereby a rescue or resupply mission may be performed in space.

Figure 1:
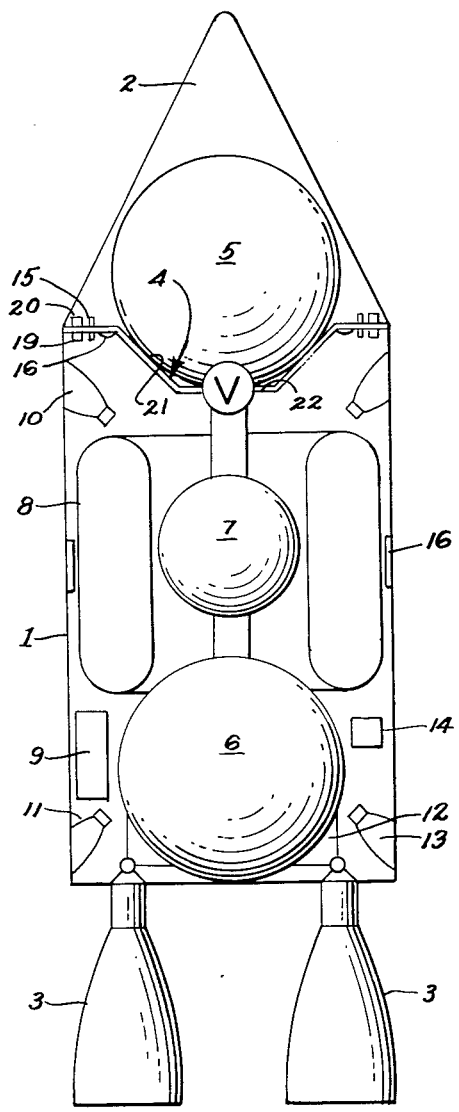
FIG. 1 is a partially sectioned elevational view, schematically illustrating a primary rocket booster of this invention.

The primary rocket booster of FIG. 1 comprises a cylindrically shaped aft-portion or thrust unit 1 arranged in axial alignment with a fore-portion or propellant unit 2. Unit 1 may serve as a basic container for housing various actuating components of the booster system. A plurality of conventional thrust means or engines 3 are suitably gimballed at the aft end of this unit for propulsion purposes. A docking face 4 is arranged at a fore-end thereof and is adapted to be detached from propellant unit 2 and thereafter have a space payload coupled thereto, as will be hereinafter more fully explained. Unit 2 of the primary booster comprises a main propellant tank 5 arranged to be protected by a suitable aerodynamic fairing.

Unit 1 comprises suitably arranged propellant tanks 6 and 7, an annularly shaped pressurization system or pump 8, an on-board power supply system 9, separation systems 10, attitude control systems 11, thrust control systems 12 and various other conventional systems generally shown at 13 for enabling the rocket booster to perform such maneuvers as may be required for station-keeping, closing, mooring, rendezvous, docking and making mid-course corrections. Further guidance and control systems required for the booster are schematically illustrated at 14. The construction and arrangements of the herein briefly described components are conventional and therefore, further explanation is not deemed necessary thereon.

After unit 2 is jettisoned from unit 1 of the booster by conventional separation means 15, signalling means 16 in the form of flashing lights or transponders may be used to aid in the acquisition and control of a space payload unit which can subsequently be attached to unit 1 at the docking face 4. Means comprising conventional valve means 17 are arranged to automatically cut off communication between tanks 5 and 6 and communicate tank 7 with tank 6 pursuant to the jettisoning operation. This general arrangement is schematically illustrated in FIG. 1a.

Tank 6 may contain a cryogenic or non-cryogenic oxidizer of the liquid propellant variety, such as fluorine. After the booster is placed in a particular orbit, such as an Earth parking orbit, the first propulsive thrust, to effect injection into a high energy orbit, wherein a space rendezvous operation may be performed is able to occur. Primary fuel, such as liquid hydrogen, stored in tank 5 is mixed with the oxidizer contained in tank 6 to power the rocket engines during this initial operation. The pressurization means or systems may comprise a helium gas which functions to supply suitable amounts of the liquid propellant to thrust means 3 in a conventional manner.

After the propellant in tank 5 has been substantially depleted and separation means 15 have been actuated to jettison unneeded unit 2 away from unit 1, tank 7 is automatically communicated with tank 6 by valve means 17.

Tank 7 may contain a secondary fuel, such as hydrozene ($N_2H_4$) which will readily mix with the oxidizer of tank 6 to provide a secondary power source for the actuation of the engines. Suitably arranged secondary engines 10 may be employed to aid in separating the units by moving unit 1 relative to unit 2.

Attachment means 19 may be arranged on peripheral portions of unit 1 of the primary booster to aid in securing units 1 and 2 together and to further aid in the locking function, as will be hereinafter more fully explained. Such an attachment means may comprise magnetic latches or the like which will initially cooperate with like means 20 formed on payload unit 2 and later cooperate with like means formed on a secondary payload unit which is attached thereto in lieu of unit 2. The attachment means may be energized or de-energized by command signals directed thereto either from Earth stations or a programmer of the booster.

To further facilitate the docking and coupling functions, docking face 4 of unit 1 is constructed and arranged to form a dish-shaped configuration. Conically shaped ramp portions 21 thereof diverge away from the second unit and provide that mating portions of a payload unit which is later attached thereto will be automatically centered. The ramp portions 21 terminate in a base portion 22 which functions to positively seat the received payload and contains suitable connection means for connecting various components of the two coupled units.

Figure 2:
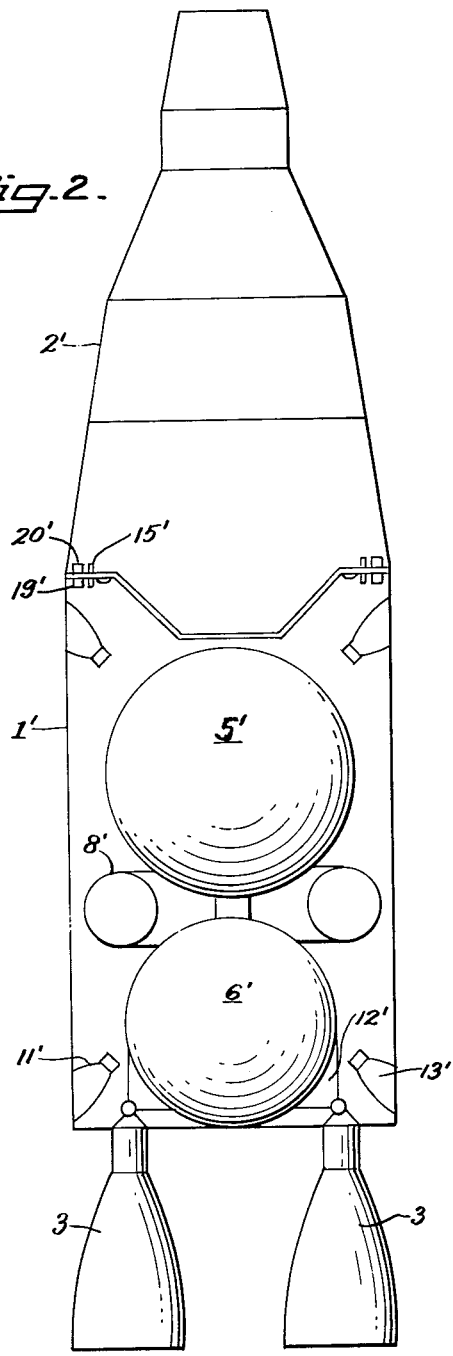
FIG. 2 is a view similar to FIG. 1 illustrating a secondary rocket booster of this invention.

FIG. 2 discloses the secondary booster. Components which have functions corresponding to components shown in FIG. 1 have like numerals, accompanied by a prime symbol. A primary fuel or liquid hydrogen tank 5' is arranged in a thrust unit 1', which unit is generally dispensed with after rendezvousing and docking operations have been accomplished. A payload unit 2' may either be manned or unmanned, depending upon the particular space operation. This unit comprises an aft portion which has a conical configuration comprising outer tapered surface portions 23 which will function to readily center the payload with respect to docking face 4 of unit 1. As above suggested, magnetic latch means 19 of unit 1, preferably in the form of an annular member arranged on peripheral portions of unit 1, is adapted to cooperate with similarly shaped magnetic latch means 20' of unit 2' to aid in the positive coupling of the two units together.

FIG. 3 discloses the units 1 and 2' as they would appear just prior to the coupling step. As noted, magnetic latch means 19 and 20' are exposed and are brought into close proximity with respect to each other by the suitable rendezvous sensors 16 and guidance and control system 14. Rendezvous and docking command signals may be made to generate from payload unit 2' to thus cooperate with sensors 16 of uint 1 in a conventional manner to complete the docking operation.

After the docking or coupling operation has been accomplished, the completed spacecraft is capable of performing a post rendezvous thrust operation by means of engines 3, fuel contained in 7 and residual oxidizer in 6. Suitable connections may be automatically made between the units to permit the control signals to generate from payload unit 2'.

FIG. 4 discloses a modified booster structure comprising thrust unit 1a and jettisonable propellant unit 2a which, following a space rendezvous with a space payload, such as 2', is adapted to be conveyed to regions in space, such the Moon's surface. The disclosed landing gear structure, generally shown at 25, may be suitably arranged to be properly stowed during launch from Earth and subsequently positioned for a particular landing operation.

FIGS. 5a–5c disclose a method by which the above described apparatuses may be utilized to perform a circumlunar mission. The first step of this method comprises launching the primary booster from point P on planet Earth, E, for example, and placing it into a parking orbit $O_1$. It is well known in the art that the perigee and apogee altitudes of such a satellite orbit approximate a distance of from 100 to 500 miles. The secondary booster is then launched into a second low earth parking orbit $O_2$, as shown in FIG. 5b. The two orbits are maintained substantially co-planar with respect to each other.

At points $A_1$ and $A_2$ in FIG. 5c, the primary and secondary boosters, respectively, are accelerated so that they each attain an out-of-orbit or injection velocity sufficient to propel the boosters into high energy orbits, directed towards the planet moon M, for example. At suitably timed intervals space payloads contained within or attached to the two boosters are thus subjected to a secondary lauch from their parking orbit and are placed into appropriate circumlunar trajectories $T_1$ and $T_2$, respectively. The two trajectories are maintained substantially co-linear with respect to each other and thus facilitate the rendezvous and docking operation at area R.

During this step of operation, unit 2 of the primary booster is jettisoned away from unit 1 and unit 1' of the secondary booster is jettisoned away from unit or payload 2'. As above described, valve means 17 (FIG. 1a) will then function to automatically communicate tanks 6 and 7. Unit 1 is then maneuvered into position behind and into substantital axial alignment with payload 2', pursuant to the above described command signals. After such aligning of the units, unit 1 is moved towards and into coupled relationship with payload 2' by means of the hereinbefore described magnetic latch means 19 and 20'. Further attachment means such as conventional bolts or the like may be employed to assure positive coupling therebetween. A single unit or spacecraft is thus formed which may then proceed along trajectory $T_1$ to the moon.

The Earth return steps of the circumlunar mission are disclosed in FIG. 5d. After circling the Moon, the spacecraft moves towards the Earth in a trajectory $T_3$ that may possess a different orbital inclination than that of the translunar trajectory $T_1$, formed on the approach to the Moon. Mid-course corrections may then be made as directed from Earth tracking stations or from the unit of the spacecraft itself. At an appropriate distance from Earth, which will roughly establish the perigee of the final Earth return orbit $O_3$, the remaining propellants contained in propellant tanks 6 and 7 (FIG. 1) are expended to brake the spacecraft into the low orbit, $O_3$.

After entering the relatively low Earth orbit, unit 1 of the booster may be jettisoned to thereby free payload unit 2' therefrom. The payload unit can then initiate an atmospheric reentry from a predetermined orbital altitude. It should be understood that if the payload unit reenters the atmosphere it must be designed to withstand aerodynamic heating and reentry deceleration loads.

FIGS. 6a–6c disclose method steps which may be used to supplement the method illustrated in FIGS. 5a–5c so as to perform a lunar orbit and Earth return mission by means of three Earth launches. After the first steps disclosed in FIGS. 5a–5c are carried out, the booster-payload spacecraft combination assembled in transit is braked by performing a retro-thrust operation at point B wherefrom it enters a stable lunar orbit $L_1$, about Moon M.

At approximately the time this operation has been completed, an unmanned rocket booster, similar to that shown in FIG. 1, is launched from Earth and placed into a parking orbit $O_4$. At an appropriate time, the rocket booster is accelerated at point $A_3$ and unit 1a is injected into a translunar trajectory $T_4$ such that it will circumnavigate the moon. FIG. 6b depicts the jettisoning of the expended fuel containing unit 2 at some point along the circumlunar trajectory $T_4$. Thrust unit 1a proceeds around the moon and is tracked by sensors located aboard the spacecraft encircling the moon in lunar orbit $L_1$.

FIG. 6c discloses a launching of the spacecraft 2' from lunar orbit $L_1$ along an Earth-return trajector $T_5$. This trajectory is coplanar with respect to return trajectory $T_6$ taken by thrust unit 1a. After burnout of unit 1, it is jettisoned and payload 2' employs its sensors to command orbital rocket booster 1a into an in-transit rendezvous and docking at point I to form a new spacecraft. The remaining portion of the lunar orbit mission is identical to that above described in connection with FIG. 5d, wherein a retrograde propulsion step in the operation is used to return the manned payload unit to an Earth orbit.

FIGS. 7a–7f illustrate a method whereby the apparatus of this invention may be employed to perform a one-way logistic mission to the surface of the Moon. The additional steps illustrated in FIGS. 7g–7k may be utilized to carry out a round-trip manned mission to the Moon's surface.

FIG. 7a depicts the initial launching of a FIG. 1 type primary rocket booster from Earth. The booster is placed into a parking orbit $O_1$ and subsequently injected by means of a suitable thrust operation into a translunar trajectory $T_1$ calculated to permit unit 1 to reach the regions of the Moon after unit 2 has jettisoned in the above described manner. Unit 1 is then suitably braked to place it into a lunar packing orbit $L_1$.

FIG. 7b discloses a second launch from Earth of an unmanned primary rocket booster which is placed into a parking orbit $O_2$. The second booster may also be of the FIG. 1 type, but equipped with a landing gear and guidance equipment capable of negotiating a lunar landing. A typical arrangement of such a landing gear is shown in FIG. 4.

FIG. 7c discloses a third launching from Earth of a secondary booster (FIG. 2) which is placed into a parking orbit $O_3$ which is co-planar with respect to orbit $O_2$. The boosters are then made to follow trajectories $T_2$ and $T_3$ in the above described manner. The in-transit rendezvous steps in the operation are carried forth in the manner shown in FIG. 7d so as to combine unit 1a of the primary booster with modified manned payload unit 2'a of the secondary booster to form a first spacecraft. The first spacecraft then follows trajectory $T_2$ and performs a retrograde thrust operation (FIG. 7e) to place it into a lunar orbit $L_2$ which is co-planar with lunar orbit $L_1$.

As shown in FIG. 7f, a retro-thrust operation may then be utilized to brake the manned payload from lunar orbit $L_2$. The landing gear incorporated on the modified rocket booster 1a then enables the manned payload 2'a and its lunar launch package 1a to be landed on the Moon's surface. This completes the one-way logistic mission.

In order to return manned payload 2'a to Earth, a fourth Earth launch operation is performed after the lunar landing mission is completed. A primary rocket booster (FIG. 1) is placed into an Earth parking orbit $O_4$ from which it is subsequently ejected by a suitable thrust operation into a translunar trajectory $T_4$ designed to circumnavigate the Moon. After leaving the parking orbit, the expended propellant containing unit 2 is jettisoned from unit 1b.

In a suitably timed relation with respect to the approach of unit 1b to the Moon, manned payload 2'a is launched from the landed rocket booster structure (FIG. 7g) into a lunar orbit $L_3$ that is co-planar with respect to orbit $L_1$. Payload 2'a may comprise thrust means in the form of rocket motors to boost it away from unit 1a and into orbit $L_3$. Payload 2'a and unit 1 then combine pursuant to an orbital rendezvous and docking operation to form a second spacecraft, shown in FIG. 7h.

The formation of the second spacecraft is completed before propellant bearing unit or payload 1b reaches the Moon along trajectory $T_4$ and begins its lunar fly-by operation. Sensors located on the manned spacecraft then acquire signals emitted from unit 1b so that the proper thrust attitude is calculated. As shown in FIG. 7i, the manned spacecraft is then launched from lunar orbit $L_3$ into a trans-Earth trajectory $T_5$ that is co-planar to a circumlunar return trajectory $T_6$ taken by a unit 1b.

After the spacecraft has acquired its target, the spent thrust unit 1 is jettisoned therefrom and exchanged for propellant carrying unit 1b on trajectory $T_6$, pursuant to an in-transit rendezvous and docking operation. The completed third spacecraft then proceeds to Earth along trajectory $T_5$.

FIG. 7j discloses the braking of the spacecraft from its trans-Earth trajectory $T_5$ into a low Earth orbit $O_5$. Rocket booster propellant may be used to correct the initial orbital elements so that it can be accurately tracked from stations located on Earth. As shown in FIG. 7k, a reentry vehicle 2b may be launched from Earth and placed into an orbit $O_6$ which is coplanar with respect to orbit $O_5$ for the purpose of returning the crew of unit 2'a to Earth.

By means of transponders or other suitable equipment located on orbiting unit 2'a, this unit and vehicle 26 may be caused to rendezvous. The crew may then be transferred from unit 2'a to reentry vehicle 26. Vehicle 26 may comprise suitable retro-thrust means to permit a safe earth landing. The operation may also be performed by means of an orbiting space station wherefrom the crew may be then transferred to the reentry vehicle.

FIG. 8 discloses another method for performing a circumlunar mission by employing modifications of the above described booster assemblies employed in the method illustrated in FIGS. 5a–5d. Instead of utilizing such booster assemblies as the post rendezvous propulsion unit needed to accomplish a retrograde thrust for return to earth, a propellant carrying unit 1c in combination with a payload unit 2c may be used.

As illustrated, unit 2c may have rocket engines employed thereon to achieve the desired thrust requirements. The steps of the method may comprise simultaneously launching from Earth and placing into parking orbits $O_1$ and $O_2$ units 1c and 2c, respectively. After the units have been placed into their parking orbits, they are launched therefrom into trajectories $T_1$ and $T_2$. The units rendezvous in the manner shown and are coupled to each other in accordance with the principles above described.

The formed spacecraft then proceeds into the translunar flight and return to Earth along trajectory $T_3$. A retro-thrust operation is then performed to return the spacecraft to an orbit $O_3$ which is compatible for reentry into the Earth's atmosphere. The expended propellant tank unit $1c$ may then be separated from the manned payload by the above described separation means. Manned unit $2c$ then performs the necessary retro-thrust operation and returns to an acceptable landing area on Earth.

FIGS. $9a$–$9e$ disclose a rescue method of operation utilizing novel concepts of this invention. FIG. $9a$ presents a situation wherein a manned first spacecraft $1$–$2'$ (FIG. 3), returninig from the Moon to the Earth along trajectory $T_1$, fails to obtain a retro-thrust operation from unit 1 and consequently continues about the Earth on a second, high-energy orbit $O_1$. To rescue the crew, an unmanned launch from the Earth of a primary rocket booster $1a$–$2$ (FIG. 1) places the booster into an appropriate parking orbit $O_2$ which is co-planar with orbit $O_1$ of the spacecraft.

The booster and spacecraft rendezvous and exchange thrust units in accordance with the above described principles. The newly formed second spacecraft then performs a retro-thrust operation (FIGURE $9b$) which places it into a short period, reduced apogee altitude orbit so that it can more quickly return to Earth in the manner shown in FIGS. $9c$–$9e$.

FIG. $9d$ discloses a second retro-thrust operation performed by the newly formed spacecraft. This operation is preferably made to occur at the perigee of the orbit so that the apogee altitude is further lowered and a more circular orbit $O_3$ about the the earth results. FIG. $9e$ depicts the jettisoning of the empty thrust unit from the manned unit $2'$ after which unit $2'$ may make an appropriate landing at a preselected point on earth, after completing an atmospheric reentry.

It should be understood that the orbital rocket booster means described above is also adapted to perform interplanetary missions as well as missions to the moon. One major difference between lunar and interplanetary missions is the quantity of payload weight assigned to each rocket booster. Certain interplanetary missions will generally require from two to three times the escape payload weight needed for a lunar landing mission. Consequently, either more launches of rocket boosters will be associated with such interplanetary missions or larger rocket boosters will be required.

When traveling to an interior planet by means of a minimum energy or Hohmann trajectory, whereby the transfer orbit is co-tangential with the departure orbit and the arrival (planet) orbit, there are two major thrust operations that must be performed on the in-bound (to the planet) route. One thrust operation is that which retro-grades a spacecraft so that it falls to the planet out of the earth's heliocentric orbit. The other, occurring near the planet, is a retro-grade thrust operation that enables the spacecraft to slow up and match the velocity of the planet. Return to earth from an interior planet necessitates reverse conditions, i.e., a thrust operation to "climb up" toward the earth and another posi-grade thrust to match the velocity of the earth. When traveling to an exterior planet which is farther away from the sun than the earth, such thrust operations are reversed. On the outbound leg, there is a posi-grade thrust near the earth and a posi-grade thrust near the planet. On the return leg, the spacecraft must first retro-grade near the planet and again when it arrives near the earth in order to match the velocity of the earth.

FIGS. $5a$–$5c$ may be used to depict a fly-by of a planet located farther away from the sun than the earth. An earth-return mission is not made possible by employing the minimum energy co-tangential Hohmann trajectory, however, since the constellation of the exterior planet and the earth can never be compatible for such a mission. Consequently, additional energy must be spent in order to enable the fly-by spacecraft to return to earth. Fly-bys of interior planets can be represented by these figures if the posi-grade thrust conditions shown in FIG. $5c$ and the retrograde thrust shown in $6d$ are reversed, i.e., made retrograde and posi-grade, respectively.

FIGS. $5a$–$5c$ and $6a$–$6c$ are representatives of an interplanetary mission to an exterior planet, such as caps, except that on the out-bound leg the retro-thrust shown in FIG. $6a$ must be made a posi-grade thrust operation. The lunar orbit mission is typical in most respects to an interplanetary mission to exterior planets performed by use of a Hohmann orbit. Interplanetary missions are generally considered to return the spacecraft to an earth orbit. The orbit $T_4$ shown in FIG. $6b$ will be a heliocentric orbit rather than a circumlunar orbit and must possess a period such that it will circle the exterior or the interior planet at the precise time when the departure of $2'$ from the planetary parking orbit is required to occur.

FIGS. $7a$–$7k$ can similarly be used to depict interplanetary missions if consideration is given to appropriate timing of launches from earth of the various rocket boosters, as well as the posi-grade or retrograde nature of the various thrust operations performed near earth and the other planet.

I claim:
1. An apparatus for effecting an in-transit space rendezvous comprising first and second connected units arranged in axial alignment, separation means for selectively disconnecting said second unit from a docking face arranged at a forward end of said first unit, said docking face constructed and arranged to form a dish-shaped configuration comprising conically-shaped ramp portions terminating in a base portion, said ramp and base portions adapted to automatically center and positively seat a unit which is coupled thereto in lieu of said second unit, thrust means operatively connected on an aft end of said first unit for selectively propelling said units, a first tank arranged in said second unit adapted to retain a first liquid fuel therein, second and third tanks arranged in said first unit adapted to retain a liquid oxidizer and second liquid fuel therein, respectively, and means arranged for initially communicating said first and second tanks and said thrust means when said first and second units are maintained in connected relationship and further arranged for automatically cutting off communication between said first and second tanks and communicating said second and third tanks and said thrust means in response to disconnecting said first and second units from each other.

2. The invention of claim 1 wherein said first tank contains liquid hydrogen, said second tank contains liquid fluorine and said third tank contains a liquid hydrazine.

3. The invention of claim 1 further comprising attachment means arranged between said first and second units.

4. The invention of claim 3 wherein said attachment means comprises magnetic latch means arranged on opposed peripheral portions of said first and second units and further arranged to be energized or deenergized by signals directed thereto.

5. A method for effecting an in-transit space rendezvous comprising the steps of launching a primary booster comprising a thrust unit and a jettisonable propellant unit arranged in axial alignment into a first trajectory relative to a planet, launching a second booster comprising a thrust unit and a payload unit arranged in axial alignment into a second trajectory which is maintained substantially colinear with respect to said first trajectory, rendezvousing said first and second boosters, jettisoning away the expended propellant unit of said primary booster, jettisoning away the thrust unit of said secondary unit, maneuvering the thrust unit of said primary booster and the payload unit of said secondary booster to maintain them in substantial alignment and coupling the thrust unit of said primary booster and the payload unit of said secondary booster together.

6. The invention of claim 5 wherein the payload unit is automatically centered into alignment with respect to the thrust unit of said primary booster when such units are coupled together.

7. The invention of claim 5 wherein the payload unit is magnetically latched to the thrust unit of said primary booster during the coupling thereof.

8. The invention of claim 5 wherein the propellant unit of said primary booster comprises a first liquid fuel carrying tank arranged therein and the thrust unit of said primary booster has a second liquid oxidizer carrying tank and a third liquid fuel carrying tank arranged therein and further comprising the steps of initially communicating said first and second tanks with each other and automatically cutting off communication between said first and second tanks and simultaneously automatically communicating said second and third tanks in response to a jettisoning of the propellant unit of said primary booster from the thrust unit thereof.

9. A method for performing a lunar mission comprising the steps of launching a primary booster comprising a thrust unit and a payload unit from Earth, placing said primary booster into a first satellite parking orbit about the Earth, launching a secondary booster comprising a thrust unit and a payload unit from Earth, placing said secondary booster into a second satellite parking orbit which is arranged substantially coplanar with respect to said first satellite parking orbit, accelerating said primary and secondary booster so that they attain an orbit injection velocity sufficient to propel them towards the Moon along substantially co-linear trajectories, rendezvousing said primary and secondary boosters, jettisoning expended thrust unit of said primary booster away from the payload unit thereof, jettisoning the thrust unit of said secondary booster away from the payload unit thereof, maneuvering the payload unit of said primary booster into axial alignment behind the payload of said secondary booster, coupling the last-mentioned payload units together to form a new spacecraft.

10. The invention of claim 9 further comprising the steps of placing said new spacecraft into a lunar parking orbit about the Moon, launching a second primary booster from Earth, placing said second primary booster into a third satellite parking orbit about the Earth, accelerating said second primary booster so that it attains an orbit injection velocity sufficient to propel it towards the Moon, jettisoning the expended propellant structure of said second primary booster away from the payload unit thereof, circumnavigating the Moon with the payload unit of said second primary booster, guiding the last-mentioned payload unit towards the Earth along a planned trajectory while simultaneously launching said new spacecraft from its lunar orbit towards the Earth in a trajectory which is substantially co-linear with respect to the trajectory of the last-mentioned payload unit, rendezvousing said new spacecraft and said last-mentioned payload unit, jettisoning the thrust unit of said new spacecraft away from the earth return unit thereof, coupling said last-mentioned Earth return unit to a fore-end of said last-mentioned payload unit to form a second new spacecraft, placing said second new spacecraft into a fourth satellite parking orbit about the Earth and returning the payload unit of said second new spacecraft to Earth.

11. A method for rescuing a payload in space comprising the steps of placing a first spacecraft comprising axially aligned thrust and payload units into a first high energy orbit about the Earth, launching a primary booster comprising axially aligned thrust and payload units from Earth, placing said primary booster into a second high energy orbit which is substantially co-planar with respect to said first high energy orbit, rendezvousing said first spacecraft and said primary booster and replacing the payload unit of said primary booster with the payload unit of said first spacecraft to form a second spacecraft, placing said second spacecraft into an orbit about the Earth which has a shorter period and lower apogee altitude than said first and second high energy orbits and returning the payload unit of said second spacecraft to Earth.

References Cited by the Examiner

UNITED STATES PATENTS

| 2,170,136 | 8/1939 | Gavin | 244—135 |
| 2,941,764 | 6/1960 | Lee et al. | 244—1 |
| 2,977,080 | 3/1961 | Von Zborowski | 244—2 |

OTHER REFERENCES

Space/Aeronautics, August 1959, pp. 61, 62, 63, vol. 32, No. 2.

FERGUS S. MIDDLETON, *Primary Examiner.*